US008743019B1

(12) United States Patent
Eng (10) Patent No.: US 8,743,019 B1
(45) Date of Patent: Jun. 3, 2014

(54) SYSTEM AND METHOD FOR ABSTRACTING COMPUTER DISPLAYS ACROSS A HOST-CLIENT NETWORK

(75) Inventor: David Eng, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1054 days.

(21) Appl. No.: 11/132,051

(22) Filed: May 17, 2005

(51) Int. Cl.
G09G 5/00 (2006.01)

(52) U.S. Cl.
USPC .............................. 345/1.1; 345/1.2; 345/3.4

(58) Field of Classification Search
USPC ........ 345/1.1, 1.2, 1.3, 2.1, 2.2, 2.3, 3.4, 903, 345/698, 699; 709/203; 715/744
See application file for complete search history.

(56) References Cited

U.S. PATENT DOCUMENTS

| | | | |
|---|---|---|---|
| 4,603,400 A | 7/1986 | Daniels | |
| 4,955,066 A | 9/1990 | Notenboom | |
| 5,016,001 A * | 5/1991 | Minagawa et al. | 345/442 |
| 5,321,510 A | 6/1994 | Childers et al. | |
| 5,371,847 A | 12/1994 | Hargrove | |
| 5,461,679 A | 10/1995 | Normile et al. | |
| 5,499,334 A | 3/1996 | Staab | |
| 5,564,002 A | 10/1996 | Brown | |
| 5,687,334 A | 11/1997 | Davis et al. | |
| 5,689,666 A | 11/1997 | Berquist et al. | |
| 5,708,786 A | 1/1998 | Teruuchi | |
| 5,712,995 A | 1/1998 | Cohn | |
| 5,734,380 A | 3/1998 | Adams et al. | |
| 5,768,164 A | 6/1998 | Hollon, Jr. | |
| 5,796,403 A | 8/1998 | Adams et al. | |
| 5,841,435 A | 11/1998 | Dauerer et al. | |
| 5,878,264 A | 3/1999 | Ebrahim | |
| 5,900,913 A | 5/1999 | Tults | |
| 5,920,313 A | 7/1999 | Diedrichsen et al. | |
| 5,923,307 A | 7/1999 | Hogle, IV | |
| 5,977,973 A | 11/1999 | Sobeski et al. | |
| 5,978,042 A | 11/1999 | Vaske et al. | |
| 6,003,067 A | 12/1999 | Suzuki et al. | |
| 6,008,809 A | 12/1999 | Brooks | |
| 6,018,340 A | 1/2000 | Butler et al. | |
| 6,075,531 A | 6/2000 | DeStefano | |

(Continued)

FOREIGN PATENT DOCUMENTS

WO 2005026918 3/2005

OTHER PUBLICATIONS

McFedries, ebook titled "Complete Idiot's Guide to Windows XP", published Oct. 3, 2001, pp. 1-7.

(Continued)

*Primary Examiner* — Srilakshmi K Kumar
*Assistant Examiner* — Insa Sadio (57) ABSTRACT

Embodiments of the present invention include a host computer system implemented method comprising receiving an indication of total requested display size of a remotely coupled client computer system. The method further includes automatically determining a number of display screens and a predetermined average display screen size. The method further includes an operating system of the host computer system allocating therein a display area to accommodate the total requested display size and dividing the display area into a number of separate portions equal to the number of display screens usable by the client computer system. The method further includes allocating each separate portion of the display area of the host computer system to a respective display screen of the client computer wherein each separate portion so allocated functions as a separate and independent display screen.

33 Claims, 10 Drawing Sheets

(56) References Cited

U.S. PATENT DOCUMENTS

| | | | |
|---|---|---|---|
| 6,133,918 | A | 10/2000 | Conrad et al. |
| 6,191,758 | B1 | 2/2001 | Lee |
| 6,226,237 | B1 | 5/2001 | Chan et al. |
| 6,335,745 | B1 | 1/2002 | Amro et al. |
| 6,337,747 | B1 | 1/2002 | Rosenthal |
| 6,433,800 | B1 | 8/2002 | Holtz |
| 6,437,803 | B1 | 8/2002 | Panasyuk et al. |
| 6,463,459 | B1 | 10/2002 | Orr et al. |
| 6,483,502 | B2 | 11/2002 | Fujiwara |
| 6,498,721 | B1 | 12/2002 | Kim |
| 6,549,217 | B1 | 4/2003 | De Greef et al. |
| 6,590,594 | B2 | 7/2003 | Bates et al. |
| 6,600,500 | B1 | 7/2003 | Yamamoto |
| 6,628,243 | B1 | 9/2003 | Lyons et al. |
| 6,630,943 | B1 | 10/2003 | Nason et al. |
| 6,633,906 | B1 | 10/2003 | Callaway et al. |
| 6,654,826 | B1 | 11/2003 | Cho et al. |
| 6,664,983 | B2 | 12/2003 | Ludolph |
| 6,686,936 | B1 | 2/2004 | Nason et al. |
| 6,710,788 | B1 | 3/2004 | Freach et al. |
| 6,710,790 | B1 | 3/2004 | Fagioli |
| 6,724,403 | B1 | 4/2004 | Santoro et al. |
| 6,774,912 | B1 | 8/2004 | Ahmed et al. |
| 6,784,855 | B2 | 8/2004 | Matthews et al. |
| 6,816,977 | B2 | 11/2004 | Brakmo et al. |
| 6,832,355 | B1 | 12/2004 | Duperrouzel et al. |
| 6,873,345 | B2 | 3/2005 | Fukuda et al. |
| 6,915,490 | B1 | 7/2005 | Ewing |
| 6,956,542 | B2 | 10/2005 | Okuley et al. |
| 6,957,395 | B1 | 10/2005 | Jobs et al. |
| 7,007,070 | B1 | 2/2006 | Hickman |
| 7,010,755 | B2 | 3/2006 | Anderson et al. |
| 7,030,837 | B1 | 4/2006 | Vong et al. |
| 7,034,776 | B1 * | 4/2006 | Love ............................. 345/2.1 |
| 7,047,500 | B2 | 5/2006 | Roelofs |
| 7,124,360 | B1 | 10/2006 | Drenttel et al. |
| 7,129,909 | B1 | 10/2006 | Dong et al. |
| 7,159,189 | B2 | 1/2007 | Weingart et al. |
| 7,171,622 | B2 | 1/2007 | Bhogal |
| 7,212,174 | B2 * | 5/2007 | Johnston et al. ................ 345/2.2 |
| 7,269,797 | B1 | 9/2007 | Bertocci et al. |
| 7,346,855 | B2 | 3/2008 | Hellyar et al. |
| 7,359,998 | B2 | 4/2008 | Chan et al. |
| 7,370,284 | B2 | 5/2008 | Andrea et al. |
| 7,461,088 | B2 | 12/2008 | Thorman et al. |
| 7,486,279 | B2 | 2/2009 | Wong et al. |
| 7,490,297 | B2 | 2/2009 | Bates et al. |
| 7,509,444 | B2 | 3/2009 | Chiu et al. |
| 7,519,910 | B2 | 4/2009 | Saka |
| 7,523,414 | B2 | 4/2009 | Schmidt et al. |
| 7,552,391 | B2 | 6/2009 | Evans et al. |
| 7,555,528 | B2 | 6/2009 | Rezvani et al. |
| 7,558,884 | B2 | 7/2009 | Fuller et al. |
| 7,594,185 | B2 | 9/2009 | Anderson et al. |
| 7,612,783 | B2 | 11/2009 | Koduri et al. |
| 7,698,360 | B2 | 4/2010 | Rowley et al. |
| 7,739,604 | B1 | 6/2010 | Lyons et al. |
| 7,739,617 | B2 | 6/2010 | Ording et al. |
| 7,913,183 | B2 | 3/2011 | Czerwinski et al. |
| 7,953,657 | B2 | 5/2011 | West |
| 7,996,785 | B2 | 8/2011 | Neil |
| 7,996,789 | B2 | 8/2011 | Louch et al. |
| 8,176,155 | B2 | 5/2012 | Yang et al. |
| 8,190,998 | B2 | 5/2012 | Bitterlich |
| 2001/0028366 | A1 | 10/2001 | Ohki et al. |
| 2002/0054141 | A1 | 5/2002 | Yen et al. |
| 2002/0057295 | A1 | 5/2002 | Panasyuk et al. |
| 2002/0087225 | A1 | 7/2002 | Howard |
| 2002/0129288 | A1 | 9/2002 | Loh et al. |
| 2002/0140627 | A1 | 10/2002 | Ohki et al. |
| 2002/0163513 | A1 * | 11/2002 | Tsuji ............................ 345/204 |
| 2002/0175933 | A1 | 11/2002 | Ronkainen et al. |
| 2002/0186257 | A1 | 12/2002 | Cadiz et al. |
| 2002/0196279 | A1 | 12/2002 | Bloomfield et al. |
| 2003/0016205 | A1 | 1/2003 | Kawabata et al. |
| 2003/0025689 | A1 | 2/2003 | Kim |
| 2003/0041206 | A1 | 2/2003 | Dickie |
| 2003/0065934 | A1 | 4/2003 | Angelo et al. |
| 2003/0088800 | A1 | 5/2003 | Cai |
| 2003/0090508 | A1 | 5/2003 | Keohane et al. |
| 2003/0126335 | A1 | 7/2003 | Silvester |
| 2003/0177172 | A1 | 9/2003 | Duursma et al. |
| 2003/0179240 | A1 | 9/2003 | Gest |
| 2003/0179244 | A1 | 9/2003 | Erlingsson |
| 2003/0188144 | A1 | 10/2003 | Du et al. |
| 2003/0189597 | A1 | 10/2003 | Anderson et al. |
| 2003/0195950 | A1 | 10/2003 | Huang et al. |
| 2003/0197739 | A1 | 10/2003 | Bauer |
| 2003/0222876 | A1 | 12/2003 | Giemborek et al. |
| 2003/0225872 | A1 | 12/2003 | Bartek et al. |
| 2004/0019724 | A1 | 1/2004 | Singleton et al. |
| 2004/0027315 | A1 | 2/2004 | Senda et al. |
| 2004/0066414 | A1 | 4/2004 | Czerwinski et al. |
| 2004/0070608 | A1 | 4/2004 | Saka |
| 2004/0080482 | A1 * | 4/2004 | Magendanz et al. .......... 345/100 |
| 2004/0085328 | A1 | 5/2004 | Maruyama et al. |
| 2004/0153493 | A1 | 8/2004 | Slavin et al. |
| 2004/0184523 | A1 | 9/2004 | Dawson et al. |
| 2004/0222978 | A1 | 11/2004 | Bear et al. |
| 2004/0224638 | A1 | 11/2004 | Fadell et al. |
| 2004/0225901 | A1 | 11/2004 | Bear et al. |
| 2004/0225907 | A1 | 11/2004 | Jain et al. |
| 2004/0235532 | A1 | 11/2004 | Matthews et al. |
| 2004/0268004 | A1 | 12/2004 | Oakley |
| 2005/0025071 | A1 | 2/2005 | Miyake et al. |
| 2005/0059346 | A1 | 3/2005 | Gupta et al. |
| 2005/0064911 | A1 | 3/2005 | Chen et al. |
| 2005/0066209 | A1 | 3/2005 | Kee et al. |
| 2005/0073515 | A1 | 4/2005 | Kee et al. |
| 2005/0076088 | A1 | 4/2005 | Kee et al. |
| 2005/0076256 | A1 | 4/2005 | Fleck et al. |
| 2005/0091610 | A1 | 4/2005 | Frei et al. |
| 2005/0097506 | A1 | 5/2005 | Heumesser |
| 2005/0125739 | A1 | 6/2005 | Thompson et al. |
| 2005/0132299 | A1 | 6/2005 | Jones et al. |
| 2005/0140566 | A1 | 6/2005 | Kim et al. |
| 2005/0182980 | A1 | 8/2005 | Sutardja |
| 2005/0240538 | A1 | 10/2005 | Ranganathan |
| 2005/0240873 | A1 | 10/2005 | Czerwinski et al. |
| 2005/0262302 | A1 | 11/2005 | Fuller et al. |
| 2005/0268246 | A1 | 12/2005 | Keohane et al. |
| 2006/0001595 | A1 | 1/2006 | Aoki |
| 2006/0007051 | A1 | 1/2006 | Bear et al. |
| 2006/0085760 | A1 | 4/2006 | Anderson et al. |
| 2006/0095617 | A1 | 5/2006 | Hung |
| 2006/0119537 | A1 | 6/2006 | Vong et al. |
| 2006/0119538 | A1 | 6/2006 | Vong et al. |
| 2006/0119602 | A1 | 6/2006 | Fisher et al. |
| 2006/0125784 | A1 | 6/2006 | Jang et al. |
| 2006/0129855 | A1 | 6/2006 | Rhoten et al. |
| 2006/0130075 | A1 | 6/2006 | Rhoten et al. |
| 2006/0142878 | A1 | 6/2006 | Banik et al. |
| 2006/0150230 | A1 | 7/2006 | Chung et al. |
| 2006/0164324 | A1 | 7/2006 | Polivy et al. |
| 2006/0232494 | A1 | 10/2006 | Lund et al. |
| 2006/0250320 | A1 | 11/2006 | Fuller et al. |
| 2006/0267857 | A1 | 11/2006 | Zhang et al. |
| 2006/0267987 | A1 | 11/2006 | Litchmanov |
| 2006/0267992 | A1 | 11/2006 | Kelley et al. |
| 2006/0282855 | A1 | 12/2006 | Margulis |
| 2007/0046562 | A1 | 3/2007 | Polivy et al. |
| 2007/0052615 | A1 | 3/2007 | Van Dongen et al. |
| 2007/0067655 | A1 | 3/2007 | Shuster |
| 2007/0079030 | A1 | 4/2007 | Okuley et al. |
| 2007/0083785 | A1 | 4/2007 | Sutardja |
| 2007/0103383 | A1 | 5/2007 | Sposato et al. |
| 2007/0195007 | A1 | 8/2007 | Bear et al. |
| 2007/0273699 | A1 | 11/2007 | Sasaki et al. |
| 2008/0034318 | A1 | 2/2008 | Louch et al. |
| 2008/0130543 | A1 | 6/2008 | Singh et al. |
| 2008/0155478 | A1 | 6/2008 | Stross |
| 2008/0172626 | A1 | 7/2008 | Wu |
| 2008/0297433 | A1 | 12/2008 | Heller et al. |
| 2008/0320321 | A1 | 12/2008 | Sutardja |

(56) References Cited

U.S. PATENT DOCUMENTS

| | | | |
|---|---|---|---|
| 2009/0021450 | A1 | 1/2009 | Heller et al. |
| 2009/0031329 | A1 | 1/2009 | Kim |
| 2009/0059496 | A1 | 3/2009 | Lee |
| 2009/0160865 | A1 | 6/2009 | Grossman |
| 2009/0172450 | A1 | 7/2009 | Wong et al. |
| 2009/0193243 | A1 | 7/2009 | Ely |
| 2010/0010653 | A1 | 1/2010 | Bear et al. |
| 2010/0033433 | A1 | 2/2010 | Utz et al. |
| 2010/0033916 | A1 | 2/2010 | Douglas et al. |
| 2011/0219313 | A1 | 9/2011 | Mazzaferri |

OTHER PUBLICATIONS

"System Management Bus (SMBus) Specification," Version 2.0, Aug. 3, 2000; pp. 1-59.
Handtops.com, "FlipStart PC in Detail" pp. 1-4, downloaded from the Internet o Sep. 20, 2005 from http://www.handtops.com/show/news/5.
Microsoft Corporation, "Microsoft Windows Hardware Showcase", dated Apr. 28, 2005; pp. 1-5; downloaded from the Internet on Sep. 15, 2005, from http://www.microsoft.com/whdc/winhec/hwshowcase05.mspx.
Paul Thurrot's SuperSite for Windows, "WinHEC 2004 Longhorn Prototypes Gallery", dated May 10, 2004, pp. 1-4, downloaded from the Internet on Sep. 15, 2005 from http://www.sinwupersite.com/showcase.loghom_winhc_proto.asp.
PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.
Vulcan Inc., "Connectivity FAQ", p. 1, downloaded from the internet on Sep. 20, 2005 from http://www.flipstartpc.com/faq_connectivity.asp.
Vulcan, Inc., "Product Features: LID Module", p. 1, downloaded from the Internet on Sep. 19, 2005 from http://www.flipstartpc.com/aboutproduct_features_lidmodule.asp.
Vulcan, Inc., "Product Features: Size and performanc", p. 1; downloaded from the Internet on Sep. 20, 2005 from http://www.flipstartpc.com/aboutproduct_features_sizeandpower.asp.
Vulcan, Inc., "Software FAQ", p. 1, downloaded from the Internet on Sep. 20, 2005 from http://www.flipstartpc.com/faq_software.asp.
Andrew Fuller; "Auxiliary Display Platform in Longhorn"; Microsoft Corporation; The Microsoft Hardware Engineering Conference Apr. 25-27, 2005; Slides 1-29.
"Epson: EMP Monitor V4.10 Operation Guide", by Seiko Epson Corp., 2006 http://support.epsonsu/products/manuals/100396/Manual/EMPMonitor.pdf.
"Graphics: Intel ® 82852/82855 Graphics Controller Family", Intel, Archived Nov. 2, 2006 by archive.org. Dowloaded Jun. 30, 2011, http://web.archive.org/20061103045644/http://www.intel.com/support/graphics/inte1852gm/sb/CS-009064.html.
"The Java Tutorial: How to Use Combo Boxes", Archived Mar. 5, 2006 by archive.org, Downloaded Jun. 30, 2011, http://web.archive.org/web/20050305000852/http://www.mips.unice.fr/Doc/Java/Tutorial/uiswing/components/combobox.html.
Usage: NVIDIA GeForce 6800—PCIe x16, Dell, archived Jan. 15, 2006 by archive.org, Downloaded Jun. 29, 2011, http://web.archive.org/web/20060115050119/http://support.dell.com/support/edocs/video/P82192/en/usage.html.
"Virtual Network Computing", http://en.wikipedia.org/wiki/Vnc, Downloaded Circa: Dec. 18, 2008, pp. 1-4.

* cited by examiner

SYSTEM AND METHOD FOR ABSTRACTING COMPUTER DISPLAYS ACROSS A HOST-CLIENT NETWORK

RELATED APPLICATIONS

This application is related to US Patent Publication Number 20050022135 entitled "Systems and Methods For Window Alignment Grids," by Abraham De Wall, filed on Jul. 23, 2003, which is incorporated herein by reference.

FIELD OF THE INVENTION

The present invention is related to display configurations of display resolution of a host computer remotely coupled to drive one or more physical displays of a client computer. More specifically, embodiments of the invention are directed to creating individual display configurations for multiple physical displays of a client system remotely connected to a host computer.

BACKGROUND ART

When connecting to a host computer remotely from a client computer, the display configurations of the two machines can be significantly different. Through this remote session, the user is attempting to replicate the experience of using the host computer. However, the difference in the display configurations between the host computer and the client computer can alter the experience and adversely effect user satisfaction especially when the client system has multiple physical display screens. The difference can be caused by differences between the hardware (e.g., number of displays can be different, display size or resolution can be different) or limitations of the software (e.g., support for specific resolutions) used to establish the remote session.

Typically, when using multiple displays while connected to a host computer, a user can configure the multiple displays individually. However, when using a client computer to connect to a host computer, the user looses the ability to individually configure the displays because the host computer assumes a single display on the client side.

For example, assume a user at home uses software to connect to their work computer. Both computers have two displays, but the remote desktop protocol used to establish the remote connection only supports a single display. Instead of experiencing a session with two separate displays, the user is presented a single display with a stretched aspect ratio that spans both screens. This is typically not the expected scenario desired by the user.

SUMMARY OF THE INVENTION

Accordingly, a system and method for abstracting computer displays across a host-client network is presented. Embodiments of the present invention create a virtual display configuration for driving multiple separate displays located on the client computer, allowing the user to define a display configuration, which will match the configuration located at the host computer, for instance. In addition, embodiments of the present invention define a display configuration independently of the host computer, for example, if the host computer is a virtual machine with no display configuration, the client computer may define a display configuration without being limited by the software used to connect to the host. In another embodiment of the invention, the host computer automatically determines the number of displays at the client side creates a display configuration for the client side displays where each physical display functions as a separate and independent display.

Embodiments of the present invention include a method implemented on a host computer including receiving an indication of total requested display size of a remotely coupled client computer system. The method further includes automatically determining a number of display screens and a predetermined average display screen size. The method further includes an operating system of the host computer system allocating therein a display area to accommodate the total requested display size and dividing the display area into a number of separate portions equal to the number of display screens usable by the client computer system. The method further includes allocating each separate portion of the display area of the host computer system to a respective display screen of the client computer wherein each separate portion so allocated functions as a separate and independent display screen at the client side.

Embodiments of the present invention further include a system for preserving a display configuration between a host computer and a client computer coupled by a network. The system comprises a first determiner coupled to the host computer for determining an average total resolution for a first plurality of displays coupled to the host computer. The system further includes a second determiner coupled to the host computer for determining a number of displays coupled to a client computer based on a total resolution of the displays coupled to the client computer and based on the average total resolution for the first plurality of displays wherein the client computer is coupled to the host computer by a remote desktop protocol.

Embodiments of the present invention further include a method for configuring a plurality of displays. The method includes coupling a client computer to a host computer and determining a default display size of the host computer. The method further includes determining a total display size of a plurality of displays coupled to the client computer and determining a number of displays coupled to the client computer. The method further includes configuring the plurality of displays coupled to the client computer wherein the plurality of displays is configured as separate individual displays.

BRIEF DESCRIPTION OF THE FIGURES

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "communicating," "dividing," "retrieving," "receiving," "generating," "launching," "decrementing," "accessing," "processing," "maximizing," "allocating," "treating," "overriding" or the like, refer to actions and processes (e.g., flowcharts 600, 700 of FIGS. 6, and 7, respectively) that may partially or totally be performed on a computer system or similar electronic computing device or processor. The computer system or similar electronic computing device manipulates and transforms data represented as physical (electronic) quantities within the computer system memories, registers or other such information storage, transmission or display devices.

Figure 1A:
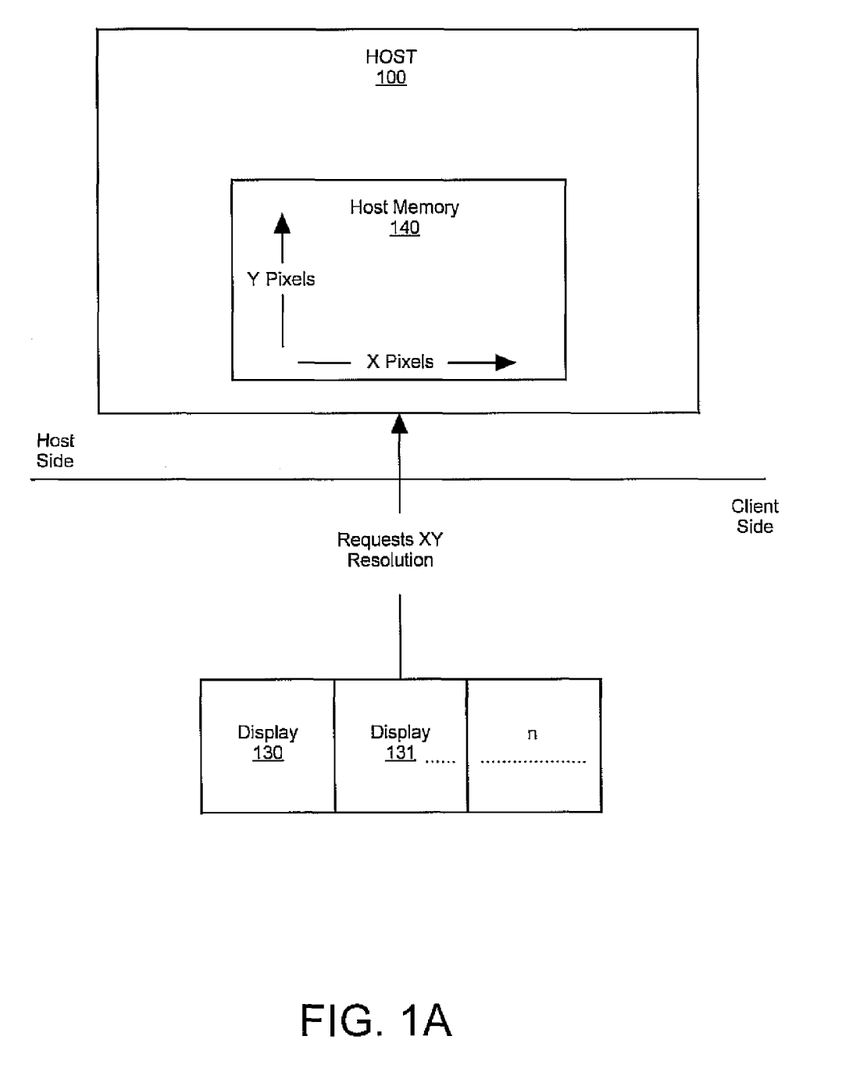
FIG. 1A is a block diagram of an exemplary client-host computer network wherein a client requests a particular display area in accordance with embodiments of the present invention.

FIG. 1A is a block diagram of an exemplary client-host computer network wherein a client side of a client-host computer network requests a particular display area in accordance with embodiments of the present invention. This request may be made using a number of well-known techniques, e.g., an rdesktop type command. In one embodiment of the invention, a client requests a resolution size of XY from the host side based on a number (n) of display screens (e.g., displays 130 and 131). The requested resolution is the total usable resolution of separate displays 130, 131, n. For example, suppose the client side had three displays of size 1000×1000, for example. The requested resolution would be 3000×1000. In response, the operating system of the host 100 allocates a display area in memory 140 to accommodate the total requested resolution.

Figure 1B:
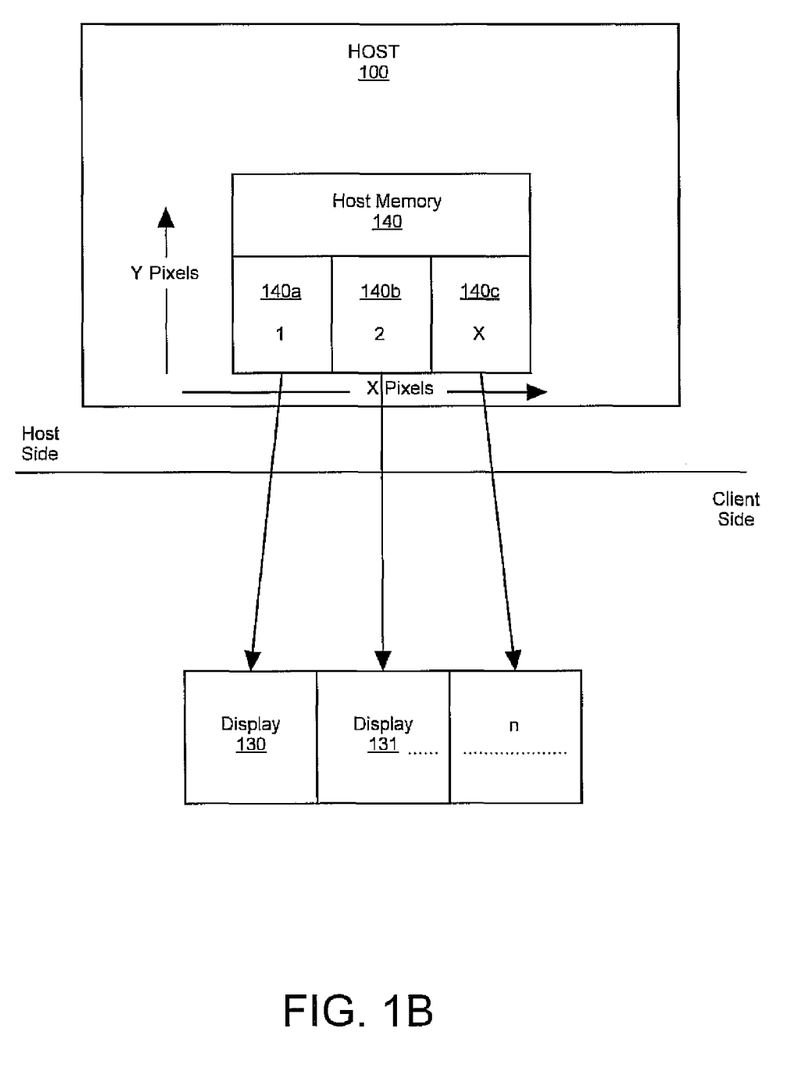
FIG. 1B is a block diagram of an exemplary client-host computer network wherein a host allocates a separate portion of a display area to a respective display screen on the client side in accordance with embodiments of the present invention.

As shown in FIG. 1B the host computer 100 allocates a separate portion of the display area to a respective display screen on the client side in accordance with embodiments of the present invention. In one embodiment of the invention, the host system 100 may automatically determine a number of display screens usable by the client. In one embodiment of the invention, the total number of displays is determined by dividing the total requested resolution by a predetermined average display size. In one embodiment of the invention, the host 100 determines the average display size. In another embodiment of the invention, the host receives the display sizes from the client side and may also receive a number indicating the number of display screens at the client side.

After the client side requests the resolution, and the host determines the number of displays, or is given the number form the client, the host system 100 allocates a separate display (of memory 140) area or portion 140a-140c to a respective display screen on the client side. In this embodiment of the invention, the separate display areas are treated as separate independent physical displays by the host computer 100 operating system. For example, if an application in a screen portion is maximized to a single display screen on the host side, the same application will maximize to a corresponding single display screen on the client side.

For instance, portion 140a is assigned to display 130 and 140b is assigned to display 131 and portion 140c is assigned to display n. An object application on portion 140a maximizes to screen 131. See the related to US Patent Publication Number 20050022135 entitled "Systems and Methods For Window Alignment Grids," by Abraham De Wall, which is incorporated herein by reference for more details about treating an abstract display area as a separate physical display screen.

Figure 1C:
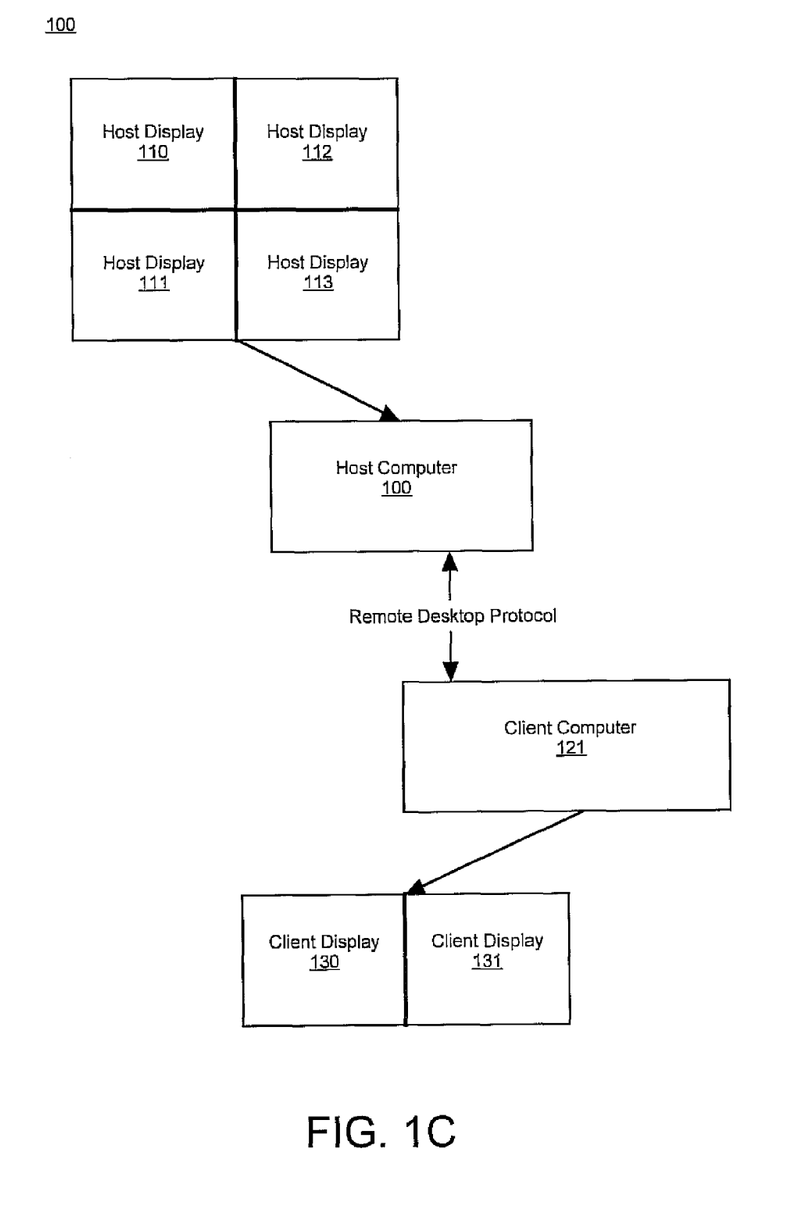
FIG. 1C is a block diagram of an exemplary computer network system in accordance with embodiments of the present invention.

FIG. 1C is a block diagram of an exemplary computer network system in accordance with embodiments of the present invention. In one embodiment, a host computer 100 may be coupled to separate host display units or screens 110, 111, 112 and 113. By using a plurality of display units (displays) on the host side, a user can spread work or other information across multiple computer screens for added efficiency. Although four displays are illustrated, any number of displays could be used in accordance with embodiments of the invention. In one embodiment of the invention, the host system may not contain any displays at all.

When connecting to the host computer from a remote location, software allows the client computer 121 to communicate with the host computer 100. In one embodiment of the invention, a remote desktop protocol (RDP) is used as part of the interface used to couple the client computer 121 to the host computer 100. It is appreciated that any communication protocol/standard may be used to couple the host computer 100 to the client computer 121 in accordance with embodiments of the present invention.

Conventionally, the software used to connect the client computer to the host computer does not support the use of multiple physical displays on the client side regardless of the display configuration of the host system. If multiple displays are used, the conventional software treats the multiple displays as a large single display. Embodiments of the present invention allow display configurations established on the host system that support more than one separate display on the client side and the client side experience is to interact with separate and independent displays.

Embodiments of the present invention create a virtual display configuration usable on the client computer 121, allowing a user to define a configuration, which may match the display configuration on host computer 100. In addition, embodiments of the present invention define a display configuration that may be independent of the displays used at the host computer 100, for example, if the host computer 100 is a virtual machine with no display configuration, the client computer 121 may define a display configuration without being limited by the software (e.g., remote desktop protocol) used to connect to the host.

For example, a user would expect a similar experience using the client computer 212 with displays 130 and 131 even though there are only two displays on the client side and four displays on the host side. Embodiments of the present invention automatically determine the number of physical displays coupled to the client computer 121 to implement this display configuration on the host side operating system so that the client experience supports the number of physical displays located at the client side. If the number of displays between the host and the client are different, object handling heuristics can be used to spread out the objects across the client side displays in some client specified fashion.

For example, if the number of displays on the client side is half of the number of displays on the host side, a user may specify that objects be spread equally between the displays. Or, a user may specify a home display where applications launch and other objects are spread to the remaining displays. In other words, the user may modify the display configurations to meet their needs.

Figure 2:
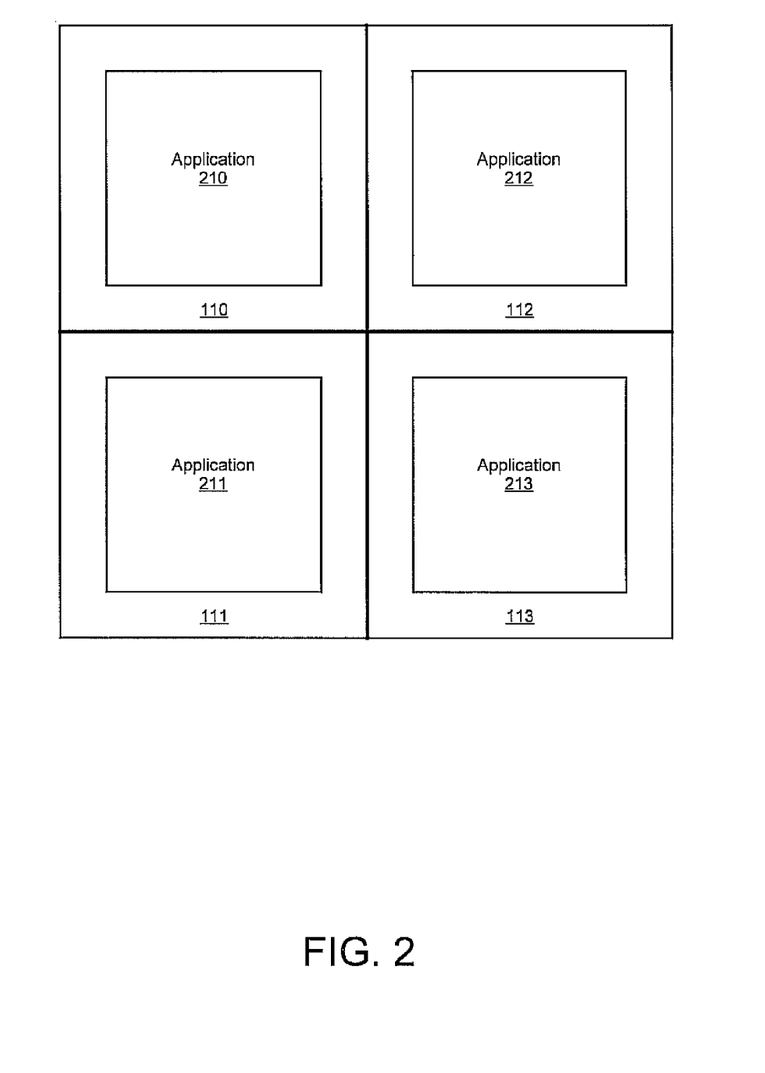
FIG. 2 is a block diagram of an exemplary multi-display system of a host computer in accordance with embodiments of the present invention.

FIG. 2 is a block diagram of an exemplary multi-display system of a host side computer in accordance with embodiments of the present invention. Physical displays 110, 111, 112, and 113 are coupled to a host computer 100 of FIG. 1. In this embodiment of the invention, applications 210, 211, 212, and 213 are maximized to a full screen. In this embodiment of the invention, each maximized application of a particular display opens to the full dimensions of its respective individual display. For example, application 210 is maximized to the full dimensions of display 110. In one embodiment of the invention, an application can be assigned to open to a specific display. In another embodiment of the invention, an application can be configured to maximize to a particular size, for example, the entire size of a display.

Figure 3:
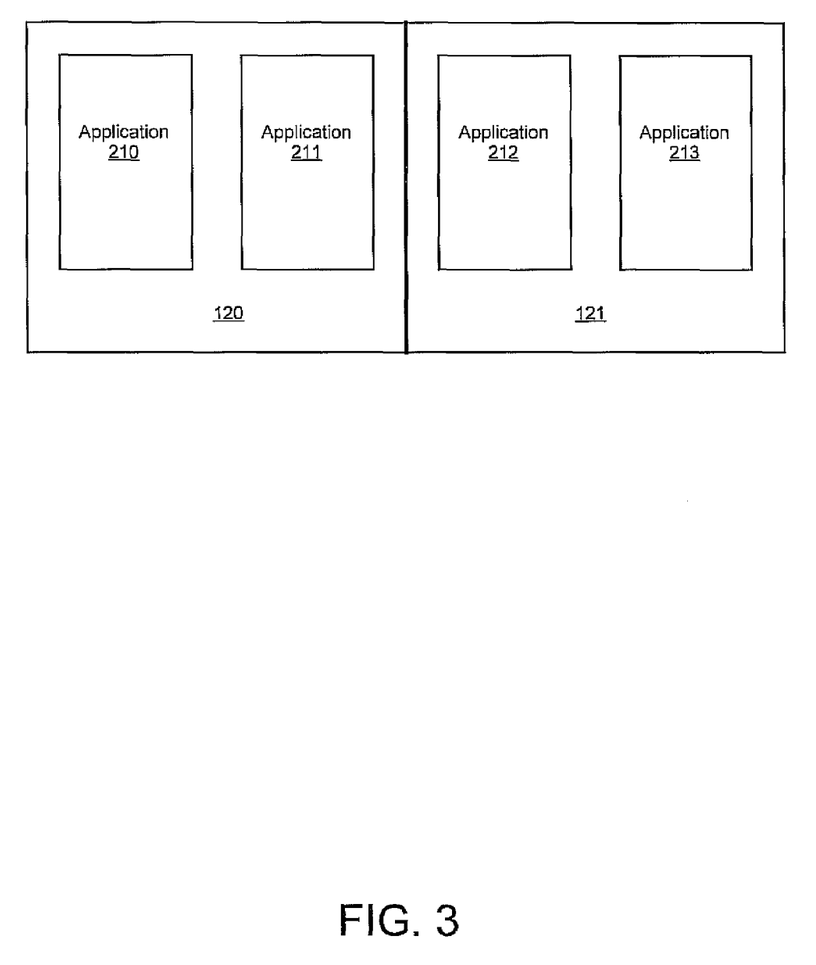
FIG. 3 is an illustration of a multi-display system of a client computer in accordance with embodiments of the present invention.

FIG. 3 is an illustration of a multi-display system of a client computer in accordance with embodiments of the present invention. Physical displays 120 and 121 are coupled to the host computer 100 of FIG. 1. Referring back to FIG. 2, the applications 210, 211, 212, and 213 are displayed on individual displays. However, referring back to FIG. 3, applications 210 and 211 are displayed on display 120 and applications 212 and 213 are displayed on display 121.

In this embodiment of the invention, the displays 120 and 121 are configured as individual separate displays, allowing applications to be maximized on individual displays, for example. Since there is half the amount of available display area on the client side as the host side, the host computer may automatically scale the information to fit on two separate physical displays. For example, if an application is assigned to open on display 110 of FIG. 2, the same application will open on display 120 of FIG. 3. Furthermore, if an application maximizes to the full size of a host display, the same application will maximize to the full size of a single client display. Alternately, a user may specify that certain applications always be in a first display and the host will maintain this assignment whether the user is on the host directly or remotely from a client computer.

Conventionally, a maximized window (e.g., application 210) would be enlarged to cover both displays 120 and 121 because the host computer 100 would not be aware that there are two individual displays at the client side. The total resolution on the client side would be treated as one large display. Embodiments of the present invention allow the operating system of the host computer to identify the number of individual physical displays on the client side and best match the display configuration of the host side to the client side depending on the client side configuration. Embodiments of the present invention also allow a user to individually configure display attributes for the displays on the client side so that certain applications may always be associated with certain displays.

For instance, in the example of FIG. 3, screens 120 and 121 are treated, on the client side, as separate physical displays in every way. Objects that are located on either display, open and are active on that display. Although the total display resolution of the host system encompasses both display 120 and display 121, they are treated as separate display entities by the host computer system 100.

Figure 4:
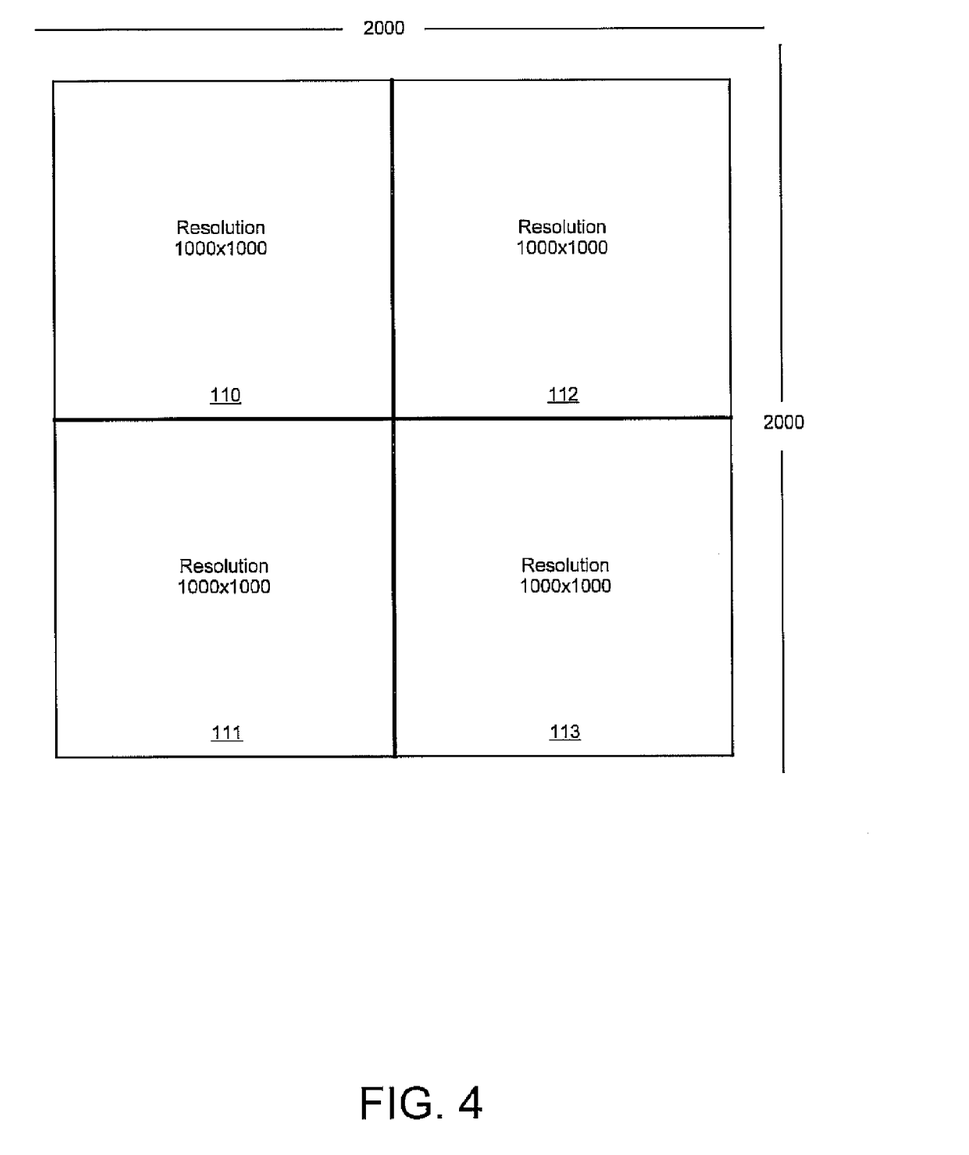
FIG. 4 is an illustration of an exemplary total resolution display size of a multi-display system on a host side in accordance with embodiments of the present invention.

FIG. 4 is an illustration of an exemplary total resolution display size of a multi-display system on a host side in accordance with embodiments of the present invention. Displays 110, 111, 112, and 113 each have an individual resolution of 1000×1000 pixels making the total resolution 2000×2000 pixels and an average resolution of 1000×1000 pixels. The average resolution can be determined by dividing the total display resolution size by the number of displays. In one embodiment of the invention, the average display resolution is considered a default resolution and can be used by the host computer to automatically determine the number of displays of a client computer based on the total resolution of the displays on the client side as reported by the client side.

Figure 5:
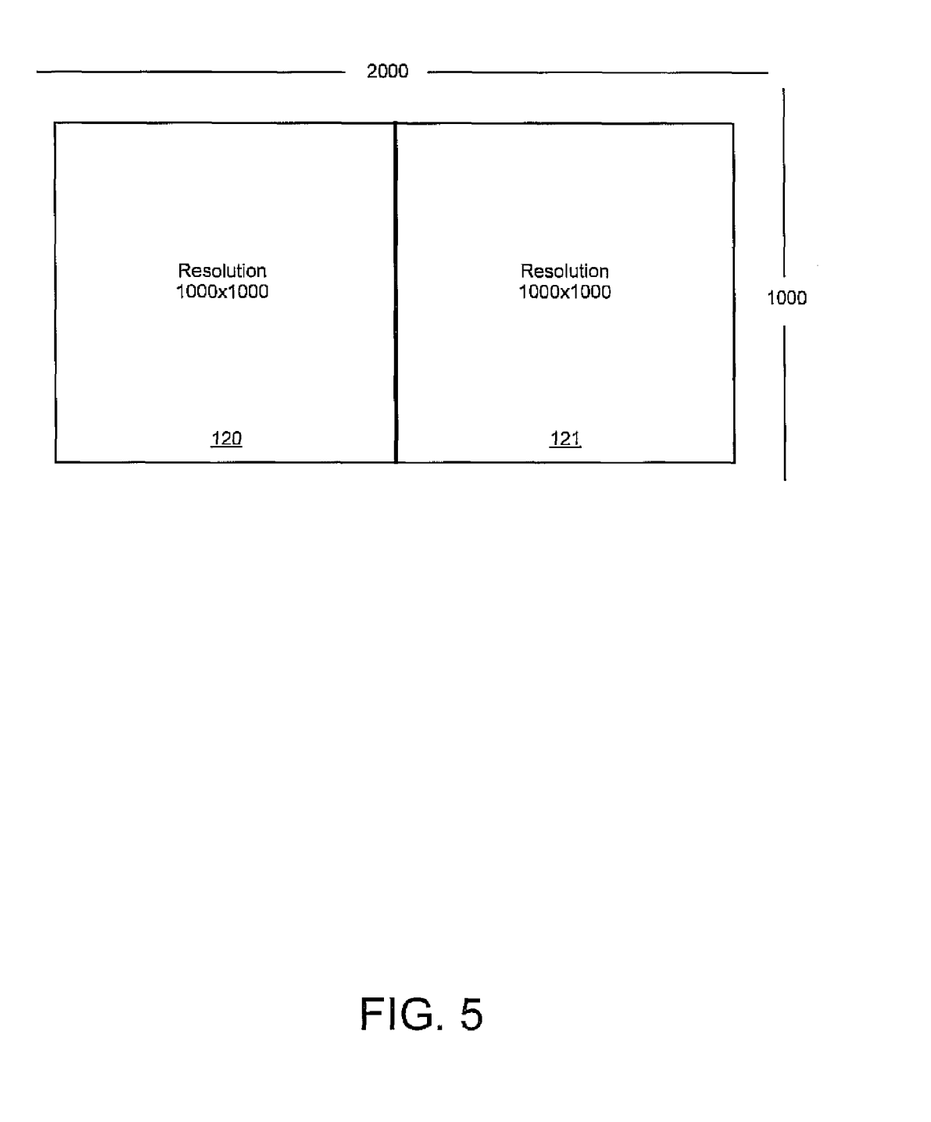
FIG. 5 is an illustration of an exemplary total resolution display size of a multi-display system on a client side in accordance with embodiments of the present invention.

FIG. 5 is an illustration of an exemplary total resolution display size of a multi-display system on a client side in accordance with embodiments of the present invention. The combined total resolution of displays 120 and 121 is 2000×1000 pixels. In one embodiment of the invention, the host computer uses the total display resolution on the client side and reported by the client side and the average display size to automatically determine the number of separate physical displays on the client side. For example, the total resolution on the client side can be divided by the average resolution on the client side to determine the number of displays on the client side. For instance, 2000×1000 divided by 1000×1000 is equal to two.

In this fashion, the host automatically determines there are two individual displays on the client side. In one embodiment of the invention, the host computer retrieves the total display resolution on the client side when the remote desktop session between the host and the client is initiated. In another embodiment of the invention, the number of physical displays on the client side is manually entered on the client side and reported to the host, for example, when initiating a remote desktop session.

Once the host automatically determines the number of physical displays located on the client side, the host operating system apportions its own display resolution across the separate displays of the client side. In effect, the host treats each display portion so assigned as a separate physical display. This creates the user experience at the client side as having N number of separate display screens to match the physical configuration thereof.

Figure 6:
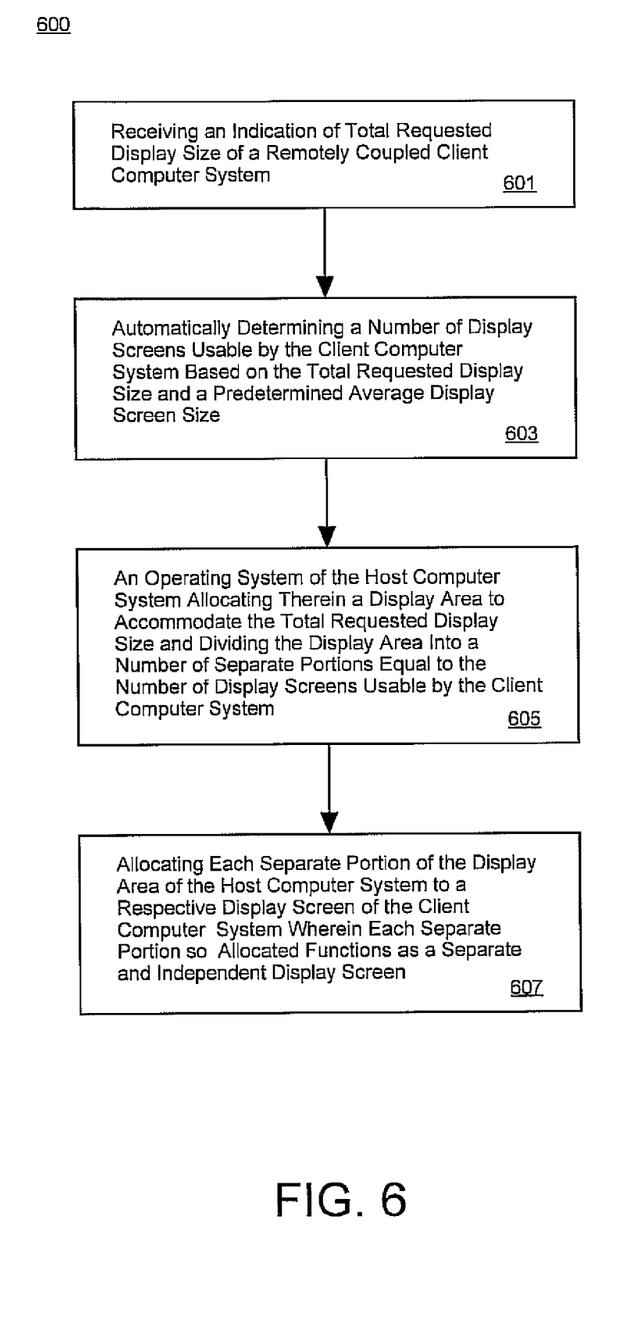
FIG. 6 is a host computer system implemented method in accordance with embodiments of the present invention.

FIG. 6 is a host computer system implemented method in accordance with embodiments of the present invention.

At step 601, embodiments of the present invention include receiving an indication of total requested display size of a remotely coupled client computer system. In one embodiment of the invention, the requested display size is the total resolution of a plurality of physically separate displays.

At step 603, embodiments of the present invention include automatically determining a number of display screens usable by the client computer system based on the total requested display size and a predetermined average display screen size.

In one embodiment of the invention, step 603 includes dividing the total requested display resolution by the determined average (e.g., default) display resolution on the host side. In one embodiment of the invention, the host side may not have any associated displays. In this case, the default display resolution can be preset.

At step 605, embodiments of the present invention include an operating system of the host computer system allocating therein a display area to accommodate the total requested display size and dividing said display area into a number of separate portions equal to the number of display screens usable by said client computer system determined in step 603. In one embodiment of the invention, the host computer treats each separate display area as a separate physical display screen on the client side. This means that the host system treats the plurality of display areas as distinct physical displays in every way.

At step 607, embodiments of the present invention include allocating each separate portion of the display area of the host computer system to a respective display screen of the client computer system wherein each separate portion so allocated functions as a separate and independent display screen.

For example, a user can associate a separate physical display with an application or the like. The user may also assign a home display so that windows maximize in the home display all of the time.

Figure 7:
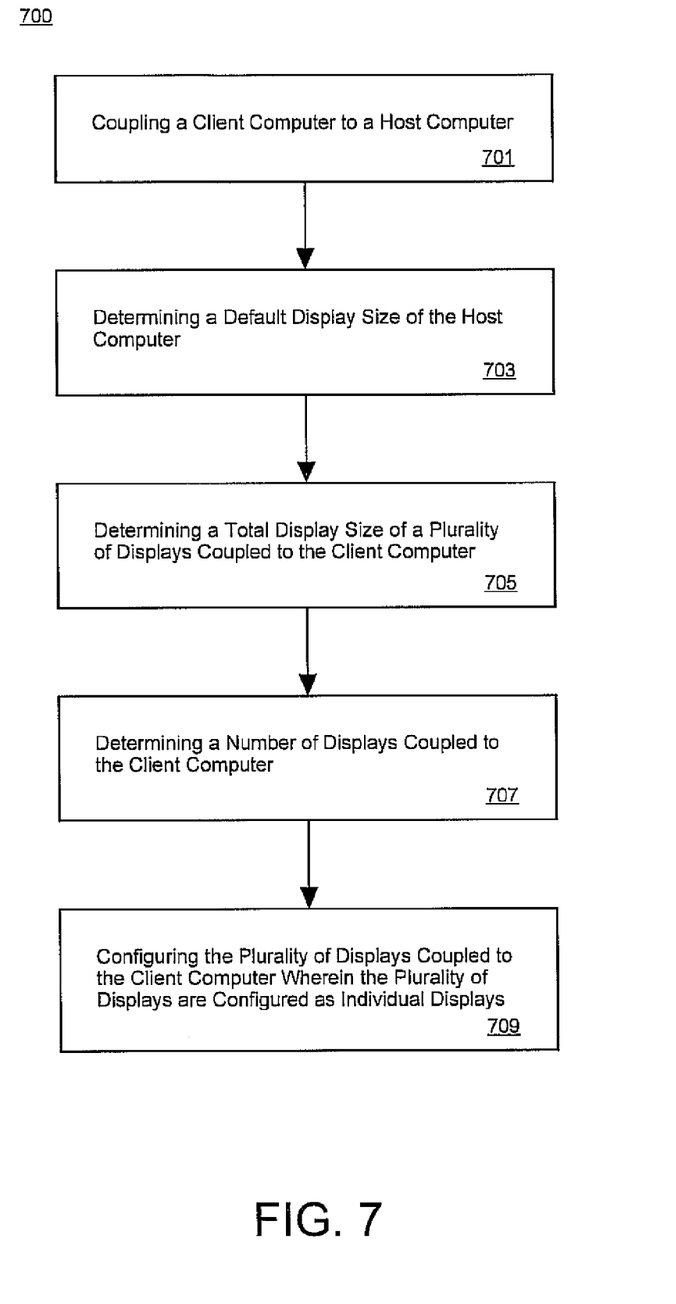
FIG. 7 is a flow diagram of an exemplary method for configuring a plurality of displays in accordance with embodiments of the present invention.

FIG. 7 is a flow diagram of an exemplary method 700 for configuring a plurality of displays in accordance with embodiments of the present invention.

At step 701, embodiments of the present invention include coupling a client computer to a remote host computer. In one embodiment of the invention, the host computer is a server computer system. In one embodiment of the invention, the client computer can be a thin client computer. It is appreciated that the host computer and the client computer can be any computer systems coupled by a network. The network can be wired or wireless in accordance with embodiments of the present invention.

In one embodiment of the invention, a remote desktop protocol is used to establish a connection between the host computer and the client computer. It is appreciated that any protocol can be used to couple the host computer to the client computer in accordance with embodiments of the present invention.

At step 703, embodiments of the present invention include determining a default display size of the host computer. In one embodiment of the invention, the host computer may not have associated displays. In this embodiment of the invention, a default display size can be pre-selected. In another embodiment of the invention, the default display size is determined by determining the average display size of displays coupled to the host computer. In this embodiment of the invention, the default display size is the average display size of displays coupled to the host computer. In one embodiment of the invention, a default display size is 1000×1000 pixels. It is appreciated that the default display size can be any display size.

At step 705, embodiments of the present invention include determining a total display size of a plurality of displays coupled to the client computer. In one embodiment of the invention, the host computer retrieves the total display size of the displays coupled to the client computer automatically when communication between the two computers is initiated. In another embodiment of the invention, the total display size of the displays coupled to the client computer is entered or selected at the client side.

At step 707, embodiments of the present invention include determining a number of physical displays coupled to the client computer. In one embodiment of the invention, the host computer automatically determines the number of displays by dividing the total display size requested by the client side by the default display size determined on the host side. In another embodiment of the invention, the number of displays is entered or selected on the client side.

At step 709, embodiments of the present invention include configuring the plurality of displays coupled to the client computer wherein the plurality of displays are configured as individual displays. In one embodiment of the invention, the host computer is aware of multiple displays on the client side and allows individual configuration of the displays such that each display is treated as a separate physical display unit. In another embodiment of the invention, the host computer matches a display configuration of displays coupled to the host computer on the displays coupled to the client computer even if the number of displays is different. In other words, display objects presented in the host system are assigned to the displays of the client system in such a way to maintain the maximum user experience of the client side to match that of the host side.

Figure 8:
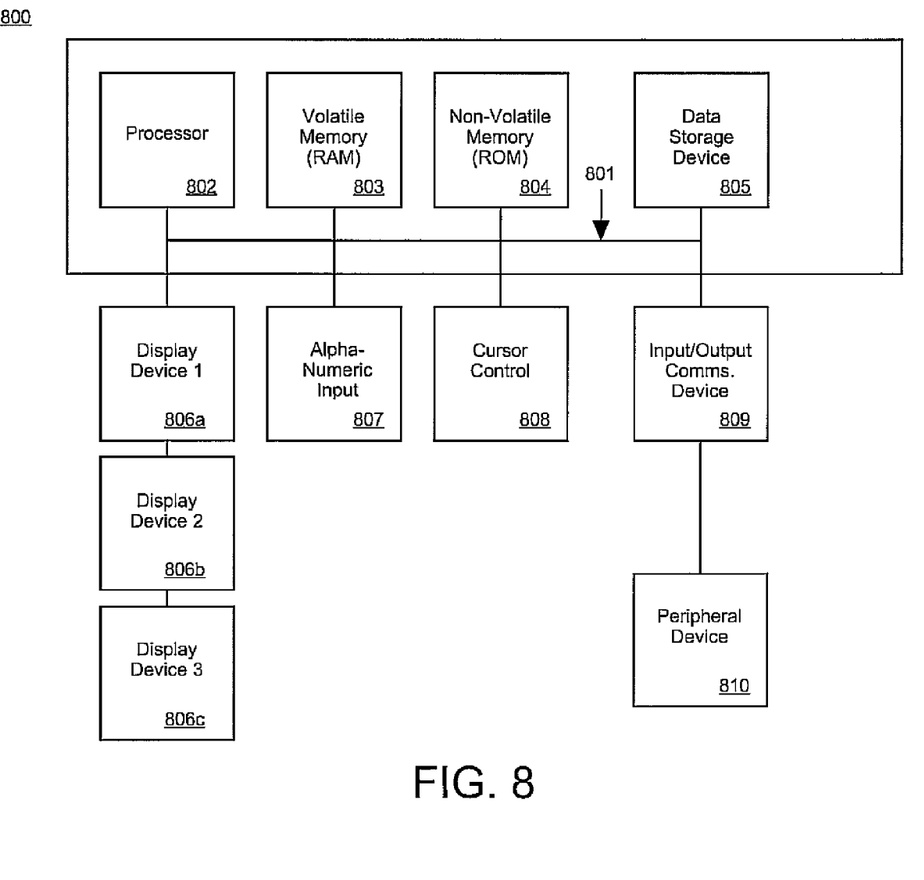
FIG. 8 is a block diagram of exemplary computer system in accordance with embodiments of the present invention.

Referring now to FIG. 8, a block diagram of exemplary computer system 800 is shown. It is appreciated that computer system 800 of FIG. 8 described herein illustrates an exemplary configuration of an operational platform upon which embodiments of the present invention can be implemented. Nevertheless, other computer systems with differing configurations can also be used in place of computer system 800 within the scope of the present invention. For example, computer system 800 could be a server system, the client system, a node on a network, a personal computer, a game console or an embedded computer system such as a mobile telephone or pager system. Furthermore, computer system 800 could be a multiprocessor computer system.

Computer system 800 includes an address/data bus 801 for communicating information, a central processor 802 coupled with bus 801 for processing information and instructions, a volatile memory unit 803 (e.g., random access memory, static RAM, dynamic RAM, etc.) coupled with bus 801 for storing information and instructions for central processor 802 and a non-volatile memory unit 804 (e.g., read only memory, programmable ROM, flash memory, EPROM, EEPROM, etc.) coupled with bus 801 for storing static information and instructions for processor 802. Computer system 800 may also contain optional display devices 806a, 806b, and 806c coupled to bus 801 for displaying information to the computer user. Moreover, computer system 800 also includes a data storage device 805 (e.g., disk drive) for storing information and instructions.

Also included in computer system 800 of FIG. 8 is an optional alphanumeric input device 807. Device 807 can communicate information and command selections to central processor 802. Computer system 800 also includes an optional cursor control or directing device 808 coupled to bus 801 for communicating user input information and command selections to central processor 802. Computer system 800 also includes signal communication interface 809, which is also coupled to bus 801, and can be a serial port. Communication interface 809 can also include number of wireless communication mechanisms such as infrared or a Bluetooth protocol.

Embodiments of the present invention, a system and method for abstracting computer displays across a network have been described. While the present invention has been described in particular embodiments, it should be appreciated that the present invention should not be construed as limited by such embodiments, but rather construed according to the following Claims.

What is claimed is:

1. A host computer system implemented method comprising:
receiving an indication of a total requested display size of a remotely coupled client computer system;
automatically determining a number of display screens usable by said client computer system based on said total requested display size and a predetermined average display screen size;
allocating, in an operating system of a host computer system, a display area to accommodate said total requested display size;
dividing, in said operating system, said display area into a number of separate portions equal to said number of display screens usable by said client computer system;
allocating each separate portion of said display area of said host computer system to a respective display screen of said client computer system wherein said allocating each separate portion of said display area is performed by the host computer system, and
wherein further, each separate portion so allocated functions as a separate and independent display screen.

2. A method as described in claim 1 wherein said number of display screens usable by said client system each function as separate and independent display screens as if each was the only display screen usable by said client computer system.

3. A method as described in claim 1 wherein said automatically determining comprises dividing said total requested display size by said average display screen size.

4. A method as described in claim 1 wherein said host computer system comprises a plurality of display screens.

5. A method as described in claim 4 wherein said plurality of display screens of said host computer system comprise a plurality of display objects.

6. A method as described in claim 5 further comprising automatically assigning said plurality of display objects across said number of display screens usable by said client system according to a user preference.

7. A method as described in claim 5 further comprising automatically assigning said plurality of display objects across said number of display screens usable by said client system according to an object balancing heuristic.

8. A method as described in claim 1 wherein said predetermined average display screen size is user programmable.

9. A system for preserving a display configuration between a host computer and a client computer coupled by a network comprising:
a host computer;
a client computer remotely coupled to said host computer via a remote desktop protocol;
a first plurality of displays coupled to said host computer;
a second plurality of displays coupled to said client computer;
wherein, said host computer determines an average total resolution for said first plurality of displays coupled to said host computer; and
wherein further, said host computer determines a number of displays comprising said second plurality of displays coupled to said client computer based on: a requested total resolution of said second plurality of displays coupled to said client computer; and said average total resolution for said first plurality of displays.

10. The system as described in claim 9 wherein further:
said host computer determines a first display configuration associated with said first plurality of displays coupled to said host computer; and
said host computer matches a second display configuration to said first display configuration, said second display configuration being associated with said second plurality of displays coupled to said client computer.

11. The system as described in claim 10 wherein said first display configuration of said first plurality of displays coupled to said host computer is independent of said second display configuration associated with said second plurality of displays coupled to said client computer.

12. The system as described in claim 9 wherein said average total resolution is a default display size.

13. The system as described in claim 12 wherein said number of displays comprising said second plurality of displays coupled to a client computer is determined by dividing said total resolution of said displays coupled to said client computer by said default display size.

14. The system as described in claim 9 wherein said average total resolution is 1000×1000 pixels.

15. The system as described in claim 9 wherein said second plurality of displays coupled to said client computer are configurable as individual displays.

16. A method for configuring a plurality of displays comprising:
determining a total display size and a predetermined average display screen size of a plurality of displays coupled to said client computer;
determining a number of displays coupled to said client computer based on said total display size and said predetermined average display screen size;
configuring said plurality of displays coupled to said client computer,
wherein said determining said total display size, said determining said number of displays, and said configuring are performed in said host computer, and
wherein further, said plurality of displays is configured as separate and individual displays.

17. The method as described in claim 16 further comprising:

dividing said total display size of said plurality of displays coupled to said client computer by a default display size to determine said number of displays coupled to said client computer.

18. The method as described in claim 16 wherein said client computer is coupled to said host computer by a remote desktop protocol.

19. The method as described in claim 16 wherein said configuring further comprises:
    configuring said plurality of displays coupled to said client computer such that an application of a given display opens on said given display of said plurality of displays coupled to said client computer.

20. The method as described in claim 17 wherein said default display size is 1000×1000 pixels.

21. The method as described in claim 16 wherein said configuring comprises:
    maximizing a window of a given display of said client computer to a full screen size on said given display of said plurality of displays coupled to said client computer.

22. The method as described in claim 16 further comprising:
    determining a display configuration of said host computer; and
    maintaining said display configuration on said plurality of displays coupled to said client computer.

23. The method as described in claim 16 further comprising:
    determining a display configuration of said host computer; and
    matching said display configuration on said plurality of displays coupled to said client computer based on said number of displays coupled to said client computer.

24. The method as described in claim 16 wherein said plurality of displays coupled to said client computer are configured independently of a display configuration of said host computer.

25. The method as described in claim 16 wherein said plurality of displays coupled to said client computer are configured independently of an application used to couple said host computer to said client computer.

26. A method for configuring a plurality of separate physical displays coupled to a client computer comprising:
    identifying a total displayable area associated with driving a plurality of separate physical displays coupled to a said client computer, said total displayable area implemented on host computer, wherein said client computer is remotely coupled to said host computer; and
    partitioning said total displayable area associated with driving said plurality of separate physical displays coupled to said client computer into a plurality of separate physical displays of said client computer and with each region treated by said host computer as a separate physical display, wherein said partitioning is performed in said host computer.

27. The method as described in claim 26 further comprising:
    identifying a default display size.

28. The method as described in claim 27 wherein said default display size is user customizable.

29. The method as described in claim 27 wherein said host computer determines said default display size by determining an average display size.

30. The method as described in claim 27 further comprising:
    dividing said total displayable area associated with driving said plurality of separate physical displays coupled to said client computer by said default display size to determine a number of said separate physical displays coupled to said client computer.

31. The method as described in claim 26 further comprising:
    maximizing a window on a first display of said client computer to only said first display.

32. The method as described in claim 26 further comprising:
    launching an application of a first display of said client computer only to said first display.

33. The method as described in claim 26 further comprising:
    assigning an application to one of said separate physical displays.

* * * * *